United States Patent
Yang et al.

(10) Patent No.: US 10,981,830 B2
(45) Date of Patent: Apr. 20, 2021

(54) FACILE CLAY EXFOLIATION USING POLYMER SILICONE SURFACTANTS

(71) Applicant: Industrial Science & Technology Network, Inc., Lancaster, PA (US)

(72) Inventors: Arthur Jing-Min Yang, York, PA (US); Sun-Mou Lai, Taipei (TW); Roman C. Domszy, Lancaster, PA (US); Tsung-Jen Wang, Taipei (TW)

(73) Assignee: Industrial Science & Technology Network, Inc., Lancaster, PA (US)

( * ) Notice: Subject to any disclaimer, the term of this patent is extended or adjusted under 35 U.S.C. 154(b) by 0 days.

(21) Appl. No.: 16/518,626

(22) Filed: Jul. 22, 2019

(65) Prior Publication Data

US 2019/0345062 A1 Nov. 14, 2019

Related U.S. Application Data

(63) Continuation of application No. PCT/US2018/016712, filed on Feb. 2, 2018.

(60) Provisional application No. 62/453,873, filed on Feb. 2, 2017.

(51) Int. Cl.
*B82Y 30/00* (2011.01)
*B82Y 40/00* (2011.01)
*C04B 24/42* (2006.01)
*C04B 103/40* (2006.01)

(52) U.S. Cl.
CPC .............. *C04B 24/425* (2013.01); *B82Y 30/00* (2013.01); *B82Y 40/00* (2013.01); *C04B 2103/40* (2013.01)

(58) Field of Classification Search
CPC ... C04B 24/425; C04B 2103/40; B82Y 30/00; B82Y 40/00
USPC ........................................................ 524/445
See application file for complete search history.

(56) References Cited

U.S. PATENT DOCUMENTS

| | | | |
|---|---|---|---|
| 6,057,396 A | 5/2000 | Lan et al. | |
| 7,223,359 B2 | 5/2007 | Torkelson et al. | |
| 2004/0054059 A1 | 3/2004 | Parker et al. | |
| 2005/0008592 A1 | 1/2005 | Gardel et al. | |
| 2006/0066012 A1* | 3/2006 | Yang et al. | 264/349 |

FOREIGN PATENT DOCUMENTS

KR  100522137 B1  10/2005

OTHER PUBLICATIONS

International Search Report dated Mar. 26, 2018 cited in PCT/US18/16712.

* cited by examiner

*Primary Examiner* — William K Cheung
(74) *Attorney, Agent, or Firm* — Perkins Coie LLP; Viola Kung (57) ABSTRACT

The present invention is directed to processes for preparing a silicone surfactant intercalated clay and a polymer-clay nanocomposite. The processes use silicone surfactants having a molecular weight in the range of 10,000 to 100,000 Dalton to achieve fully exfoliating clay structures. Using these macromolecular silicone surfactants, along with the engineered control of the processing pH and drying stress conditions, this invention provides simple and low-cost methods of making a fully-exfoliated polymer-clay nanocomposite.

9 Claims, 4 Drawing Sheets

FIG. 1

Prior art – small surfactants intercalation leads to partial clay exfoliation in polymer

FIG. 2

Invention – polymeric surfactants intercalation leads to full clay exfoliation in polymer

FACILE CLAY EXFOLIATION USING POLYMER SILICONE SURFACTANTS

This application is a continuation of PCT/US2018/016712, filed Feb. 2, 2018; which claims the benefit of U.S. Provisional Application No. 62/453,873, filed Feb. 2, 2017. The contents of the above-identified applications are incorporated herein by reference in their entirety.

This invention was made with Government support under DE-EE0006349 awarded by the Department of Energy. The Government has certain rights in this invention.

FIELD OF THE INVENTION

This invention relates to a method of designing and making a polymeric silicone surfactant capable of fully exfoliating clay structures, both in the clay's pretreatment and its subsequent blending with a host polymer.

BACKGROUND

Polymer-Clay nanocomposites have become one of the most popular choices in engineering a polymer's property by blending it with inorganic additives. One of the most desired filler material is based on the smectite class of aluminum silicate clays, of which the most common representative is montmorillonite (MMT). Since its inception in the late 1980s by the researchers at Toyota (U.S. Pat. No. 4,739,007), the concept of exfoliating clay in a polymer composite have been applied to, and demonstrated by, many examples of outstanding enhancements in mechanical, thermal, electrical, gas barrier, and flame retarding properties of various polymers respectively. The level of enhancement is critically hinged on the ability of uniformly dispersing, and eventually exfoliating, the clay particles into molecular platelets in the host polymer.

Polymer-clay nanocomposites are a family of reinforced polymers containing a low amount of layered mineral silicates (clay) particles finely dispersed at the nanometer scale resulting in substantially improved mechanical, transport, interfacial and thermal properties with a low additive cost. However, the conventional production of a polymer-clay nanocomposite, preparing the nanoclay by ion-exchange with a cationic organic surfactant and followed by its blending with a host polymer, does add significant processing costs and yet, often unsuccessful in the full clay exfoliation necessary for achieving the desired superior performances for offsetting the added processing costs.

Figure 1:
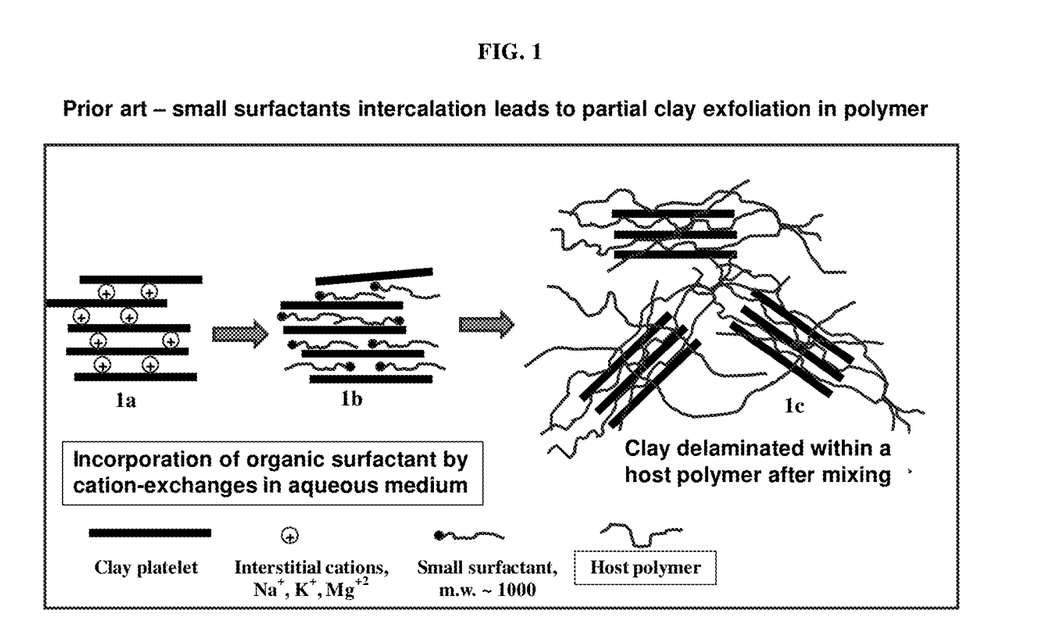
FIG. 1 is a schematic illustrating that clay intercalated with small surfactants cannot be fully exfoliated within a host polymer.

Clay particles are aggregates of platelet molecules of an extremely aspect ratio (widths/thickness ratio about 1000) held tightly by the strong electrostatic forces between the platelets' negatively charged surfaces and the small cations ($Na^+$, $K^+$, $Mg^{2+}$) sandwiched within their galleries. By using an ion-exchange process in aqueous medium, the small cationic organic surfactant molecules can be incorporated within the platelet and expand the gallery's openings. These organic treated clays, when mixed with an organic polymer by a compounding process, can intercalate some polymers within the galleries and further expand clay platelets into a delaminated state shown in FIG. 1.

The delaminated clay states in a polymer, still maintaining the small periodical spacing of the platelets as evidenced by a peak in the small angle X-ray diffraction spectrum, cannot achieve the superior performance of the fully exfoliated state (i.e. randomly dispersed clay platelets within a polymer) achieved by the Nylon 6-montmorillonite (MMT) nanocomposite of the Toyota researchers. See A. Okada et al., Mater. Res. Soc. Symp. Proc. 1990, 171, 45-50; A. Usuki et al., J Mater Res 1993, 8, 1174-1178; D. Fornes et al., Polymer 2001, 42, 9929-9940; where with only 4.2 wt % MMT loading, the modulus doubled, the tensile strength increased more than 50%, the heat distortion temperature, increased by 100° C., and combustion heat release rate decreased by up to 63%.

A fully exfoliated clay additive, even at a very small weight fraction (i.e. below 5%), can outperform the conventional clay fillers commonly loaded at several times higher percentages (over 20%). Although the polymer-clay nanocomposites have not yet reached a broad market application due to the processing difficulties, and consequently higher cost, the technology does hold an advantage over conventional composites in the performance/weight ratio. The polypropylene (PP)/clay composites' application by General Motors in two mid-size vans (GMC Safari and Chevrolet Astro vans) did register a commercial milestone of the polymer-clay nanocomposite technology (Plastic Additive Compound 2002; 4(1)30-33).

Clay exfoliation is much easier within an aqueous environment due to the reduction in charge interactions (i.e. $1/80^{th}$ of normal) by water's high dielectric constant. The cations in the clay gallery can be easily exchanged with protons (hydronium, $H_3O^+$) by acid washing to form the surface hydroxyls. The acidic treated clay surfaces are then attractive to and penetrable by a broad spectrum of candidate materials containing functional groups such as amine, hydroxyl, silanol, carboxylate, etc., which, either by acid-base interactions, or hydrogen bonding forces, can also carry an organic cargo into the clay gallery. Various clay treatment compounds and schemes of such nature had been thoroughly reviewed in Lin, et. al. (Progress in Polymer Science 2014, 39 443-485) and many related references cited therein. Despite these successes in precursors' intercalation, few of them led to a facile clay exfoliation in subsequent mixing with a host polymeric material.

All of these prior arts have shown that the real challenge of negotiating a macromolecule into the clay galleries, after a successful tallow surfactants' intercalation, is complicated by three barriers, (a) The insufficient gallery opening by a precursor with a size orders of magnitude smaller than the incoming macromolecules, (b) The alkyl straight-chain tails of the surfactant precursors, which was originally designed for their easy penetration into the narrow galleries, could form an aggregated crystalline, fence-like structure, difficult even for another small molecule, let alone a polymer, to wiggle through; (c) Such a liquid-crystalline aggregate could be further densified and interlocked with almost no flexibility after the clay's drying due to the strong hydrophobic bonding induced by capillary stresses from drying.

For making a polymer-nanoclay composite, the most common practice is to first infuse alkyl chains into the clay's gallery, by a cationic exchange, which has been proven only sufficient in reaching the delamination of clay in a host polymer after compounding, even by intensive blending/mixing forces. See S. Wang et al., Appl. Polym. Sci., 1998, 69 1557-1561; M. L. Kaneko et al., J. Appl. Polym. Sci. 2008, 108 2587-2596; R. Vaia et al., Chem. Mater. 1993, 5 1694-1696. Several alternative practices had been developed with better successes in exfoliation by (a) chemically modifying clay surfaces with organic groups highly attractive to the host polymer, (b) incorporating cationic groups onto end/side of a host polymer to improve affinity with negatively charged clay interface, and (c) physically infiltrating the low molecular weight oligomers of a host polymer into the clay gallery followed by the in-situ polymerization to expand and consequently exfoliate the clay layers.

All the above treatments had achieved a better clay delamination/exfoliation in the host medium and, consequently, improved the composite performance. However, these approaches often required much more sophisticated and complex processing schemes.

There is a need for simple and cost-effective processes for preparing a silicone surfactant intercalated clay and a polymer-clay nanocomposite that is facilely exfoliated.

DETAILED DESCRIPTION OF THE INVENTION

This invention is directed to a method of designing and making a polymeric silicone surfactant capable of fully exfoliating clay structures, both in the clay's pretreatment and its subsequent blending with a host polymer. These silicone-based polymeric surfactants can achieve superior performance in clay exfoliation due to the extreme chain flexibility of their siloxane backbone structures that allows a macromolecular surfactant adapts easily to any interfacial topology with almost zero energy penalty. Using these macromolecular silicone surfactants (molecular weight of at least 10,000 daltons), along with the engineered control of the processing pH and drying stress conditions, this invention provides simple and low-cost methods of making a fully-exfoliated polymer-clay nanocomposite.

Figure 2:
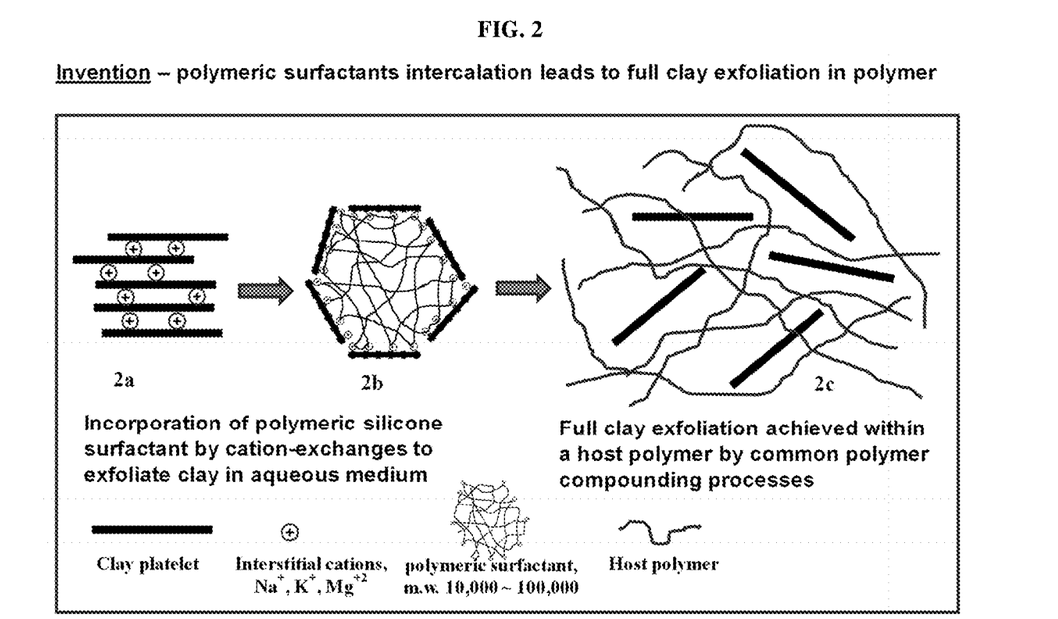
FIG. 2 is a schematic illustrating that clay treated with polymeric silicone surfactants can be fully exfoliated with a polymer by a simple compounding process.

The facile clay exfoliation achieved by this invention can be summarized by FIG. 2.

FIG. 2a. Using a relatively basic silicone polymeric surfactant (m.w.>10,000), in lieu of the common cationic tallow surfactants (m.w.<1,000), to neutralize the acidic —OH groups on the clay surface in the intercalation process, FIG. 2b. Dispersing the silicone polymer surfactants into an oil-in-water microemulsion to increase the contact of the surfactants' hydrophilic groups with clay surface and facilitate the intercalation of the hydrophobic silicone groups into the galleries of the clay platelet molecules, FIG. 2c. Controlling two important processing conditions, the solution pH during surfactant intercalation and the hydrophobic-hydrophilic interfacial tension during the drying, the former to maximize the electrostatic attraction among the basic functional groups of the polymer surfactant and the acidic clay surface and the latter for lowering the hydrophobic bonding among silicone groups induced by capillary stresses during ambient drying—both measures would preserve the exfoliated state of the polymeric silicone surfactant treated clay and significantly benefit the subsequent diffusion of larger polymers into clay galleries in blending a polymer-clay composite.

The present invention is directed to a process for preparing a silicone surfactant intercalated clay. The process comprises the steps of:

(a) obtaining a silicone surfactant, comprising PDMS (polydimethylsiloxane) hydrophobic backbone having hydrophilic, side-chain functional groups, with a general formula of, wherein X is a hydrophilic component in a hydrophilic block and interacts with acidic —OH groups at the clay surfaces, m is an integer from 1 to 20, p is an integer from 10 to 100, R is $C_{1-6}$ alkyl, m times p represents the molecular weight of the polymer silicone surfactants in the range of 10,000 to 100,000 Dalton, wherein the position of the hydrophilic block containing X is distributed among the m dimethyl siloxane groups to provide a hydrophilic-hydrophobic block, (b) penetrating the surfactant of (a) into the spacing of the clay layers in an aqueous medium by mixing the clay with a microemulsion of the silicone surfactant to form a clay-microemulsion mixture, and then adjusting the pH of the mixture within the range of pH 1-5, (c) heating the mixture of (b) to accelerate the penetration of the silicone surfactant into the spacing of clay layers in an aqueous medium to form a silicon surfactant-clay slurry, and (d) removing excess water from the slurry and drying the slurry to form a silicone surfactant intercalated clay.

Most prior arts had used precursor surfactants with molecular weights less than 2000 Daltons. The present invention uses a high molecular weight silicone surfactant (molecular weight at least 10,000 Da) to penetrate and enlarge the clay gallery openings and make it easier for the subsequent penetrations of even larger polymer (molecular weight>100,000 Da) to make a polymer-clay nanocomposite having clay exfoliation within the polymer.

One of the most challenging tasks in material nanotechnology is the uniform dispersion of inorganic additives within an organic host polymer, which, when achievable at nanometer scales, could substantially enhance the performance of an organic-inorganic composite. This invention utilizes a silicone block copolymer with functional groups specifically designed to facilitate mixing of two incompatible phases, and thus, act as a surfactant for controlling domain morphology by uniformly dispersing the otherwise incompatible components at a submicron scale.

Selection and Design of a Polymeric Silicone Intercalant

In the present process, step (a) requires a polymeric silicone surfactant as an intercalant. The present invention uses a flexible, polymeric silicone surfactant, instead of the common straight-chain, tallow surfactants practiced in prior art. The intercalation of a larger surfactant molecule into a clay gallery, like squeezing a cargo into a tight trunk, prefers the macromolecules having a flexible backbone attached with less cohesive side-groups. In this regard, PDMS back- bone block-polymer has the following distinctive advantages when compared with the conventional alkyl-chain surfactants:

(a) The Si—O and Si—C bond lengths (1.63 and 1.90 Å) are significantly longer than the C—C (1.53 Å) bonds and that the Si—O—Si bond angle (143°) is much greater than the C—C—C bond angles (109°); which make the two hydrophobic methyl groups much less obstructive in spacing arrangement (i.e. having a higher configurational entropy).

(b) The Si—O bond is partially ionic and thus less directional than the covalent C—C bonds which, combined with a longer bond length, allow more freedom for molecular groups' rotational motions which were the reasons that silicone polymer has one of the lowest glass transition temperature at −120° C. The exceptionally high configurational entropy of the silicone polymer would make their packing into the tightly-spaced clay galleries much easier than any other polymers known.

(c) The dimethyl groups on the silicone backbone are highly hydrophobic and least-cohesive, yet with a great deal of rotational freedom even at ambient temperature, thus, are most effective in penetrating the clay gallery as well as accommodating the entrance of hydrophobic host polymers in the subsequent exfoliation processing. Based on these understanding, we designed a silicone copolymer surfactant specifically for pretreatment and exfoliation of layered clay structure for making a polymer-clay nanocomposite.

The silicone surfactant suitable for the present process can be shown in a general formula as below.

R is $C_{1-6}$ alkyl. The X group in the block-copolymer surfactant is the hydrophilic components which interact with the acidic —OH groups at the clay surfaces. In one embodiment, X is selected from a hydrophilic group consisting of: —OH, —COOH, —$NR_1H$, —$NR_1R_2H^+X^-$, —CO—$NHR_1$ —(O—$CH_2$—$CH_2$—)$_n$H, —(O—$CH_2$—$CHCH_3$—)$_y$—(O—$CH_2$—$CH_2$—)$_z$H, and —C≡C—COOH, wherein $R_1$ and $R_2$ are independently H or $C_{1-6}$ alkyl, and y and z are independently an integer from 1 to 15, or 1 to 30, or 1-50. The composition ratio in the surfactant, m, is an integer of a variable amount from 1 to 15, or 1 to 30, or 1-50, and p is an integer of a variable amount from 10-100. The m and p are determined by the desired hydrophilic/hydrophobic ratio of the silicone surfactant for different combination of clay types and polymers, while m times p represents the molecular weight of the polymer silicone surfactants, preferably to be in the range of 10,000 Dalton or higher.

The dash lines in the formula above are meant to indicate that the locations of hydrophilic block (the block including X group) and hydrophobic blocks (dimethyl siloxane groups) are not fixed and can vary. For example, the hydrophilic block can be located directly after following the hydrophobic blocks. Alternatively, the hydrophilic block may be either periodically, or randomly, distributed among the hydrophobic blocks. As demonstrated by the examples provided in a later section, using such designed silicone surfactants, with control of processing conditions, have achieved facile exfoliation of clay layers both in surfactant intercalation as well as in the final compounding with a host polymer.

Intercalation of Silicone Block-Copolymer into Clay Gallery

Step (b) of the process of the present invention requires penetrating the silicone surfactant into the spacing of the clay layers in an aqueous medium by mixing the clay with a microemulsion of the silicone surfactant to form a clay-microemulsion mixture, and then adjusting the pH of the mixture within the range of pH 1-5.

Aqueous conditions are commonly utilized in the initial intercalation of a surfactant into the clay to minimize surface charge interactions and promote cation exchanges. Intercalation of a polymeric surfactant into clay layers is inherently much more difficult as a macromolecular surfactant tend to form its own aggregates in a micelle. The distance between dispersed clay platelets, even at a very low concentration (for example, 5%), is still much less than a micron due to the extreme aspect ratio (100~1000) of the clay platelet molecules. Thus, the intercalation of silicone block-copolymers into clay galleries is benefited from the preformation or the polymeric silicone surfactants into an oil-in-water microemulsion with the hydrophobic silicone blocks inwardly folded into a submicron-sized oily drop.

In the case that the hydrophilic blocks of a silicone copolymer surfactant are not sufficient for dispersing the hydrophobic silicone blocks into an aqueous microemulsion, we need to add additional emulsifiers to create such a microemulsion of polymeric silicone surfactants to assure that the charge interactions with clay layers occur at the hydrophilic-hydrophobic interfaces. The microemulsion of the macromolecular silicone surfactants can be prepared in advance of, or in-situ with, the intercalation procedure. The additional emulsifiers are added just for this purpose alone and is thoroughly washed out after a successful intercalation of the polymeric silicones. The chemical compositions of the emulsifiers, while important to the dispersion quality in the intercalation procedure, would bear no consequence on the final composite properties, and thus, they can be selected completely based on the minimizations of both material and processing costs. During the intercalation processing, the dispersed clay platelets will be adhering to the cationic groups on the silicone polymer as shown by the illustration in FIG. 2b.

The interactions between the hydrophilic group, X and the clay acidic group are sensitive to the pH conditions during the intercalation process. At the chosen pH range in our examples, the population of negatively charged, acidic hydroxyls on the clay surface and the positively charged, less acidic (more basic) groups, X, are adequately adjusted to maximize their electrostatic adhesions. In one embodiment, the X is a diamine group of the structure —NH—$CH_2$—$CH_2$—$NH_2$. For this particular silicone surfactant, the pH range is preferred to be between 2 to 5 to maximize the adhesion among the silicone surfactants' X group and the hydroxyl groups on the surface of clay layers. For other hydrophilic groups, the intercalation may require a different pH range, for example pH 1 to 5, according to the group's acid-basic dissociation constant pKa.

Heating the Clay-Microemulsion Mixture

Step (c) of the process requires heating the clay-microemulsion mixture to accelerate the penetration of the surfactant into the spacing of clay layers in an aqueous medium to form a silicone surfactant-clay slurry. The heating process typically is carried out at temperature higher than 40° C. for a sufficient time, for example, 50-95° C. for 1-5 hours, or above 100° C. under a pressurized condition for 1-2 hours.

Drying the Silicone Surfactant-Clay Slurry

The mixture of polymeric silicone intercalated clay is isolated from an aqueous medium followed by dehydrating residual adsorbed moisture prior to its blending with a hydrophobic host polymer. Step (d) of the process requires removing excess water from the slurry and drying the slurry to form a silicone surfactant intercalated clay. Removing excess water from the slurry can be done by any method known in the art, for example, centrifugation, filtration, decanting, dialysis, or solvent exchange.

After the excess water is removed, the slurry is dried. The high capillary stresses induced by drying a nanopore substrate from water could be in the range of tens to hundred times of atmospheric pressure, which can significantly shrink the clay compound and tightly close off the open channel structure created by the intercalation of polymeric silicones. This would severely hamper our efforts in fully exfoliating the clay platelets by the conventional mixing with a host polymer, particularly when blending with a highly viscous polymer. Reduction of the capillary stresses in drying could alleviate the difficulties of exfoliating the dried clay in host polymer and allow the utilization of a common plastic compounding process, such as melt calendaring, Brabender batch mixing, injection molding, or extrusion to accomplish fully exfoliated clay-polymer composite at the lowest possible cost.

The surface stress exerted by the liquid meniscus in capillary drying is proportional to the liquid-air surface tension and can be substantially reduced with drying from a low-tension liquid such as ethanol, or isopropanol. Drying off the residual water from capillary channels within the clay layers can be facilitated with adding more hydrophobic cosolvent(s) to reduce the drying stress. In one embodiment, drying is carried out by mixing the slurry with one or more solvents of an organic acid, alcohol, ketone, or aldehyde, followed by evaporating the residual moisture. The processing aid(s) to facilitate low-shrinkage drying can be one, or a combination of, solvent(s) with a variety grades of hydrophobicity including, but not limited to ethanol, IPA, acetone, butanol, pentanol, etc. In fact, the mixture solvent for low-stress drying may also include certain processing oils common to polymer processing practices such as pentane, hexane, paraffin, naphthalene, etc., to additionally improve the dispersion and exfoliation of a clay within the host polymer by a simple plastic compounding process.

Preparing a Polymer-Clay Nanocomposite

The present invention is also directed to a process for preparing a polymer-clay nanocomposite. The process comprises the steps of: mixing the silicone surfactant intercalated clay prepared according to the invention with one or more polymers to form a polymer-clay nanocomposite, wherein the nanocomposite has clay exfoliation within the one or more polymers.

In the above process, the mixing is carried out by any suitable mixing method, for example, brabender mixing, injection molding, melt extrusion, or film calendaring.

The present invention expands the commercial applications of polymer-clay nanocomposites by substantially increase its performance/cost ratio.

For the exfoliation of clay within a host polymer, the present invention offers three advantages over the current technology. (a) Low-cost intercalation of a polymeric surfactant (molecular weight over 10,000 Dalton) into the clay galleries. (b) Facile and complete exfoliation of the treated clay platelets within a host polymer by a simple compounding or melt extrusion process. (c) The utilization of intercalating polymeric silicones to carry over and uniformly disperse additional functional and/or processing additives into a polymer-clay nanocomposite for achieving the desirable physical or chemical reactions in-situ during, or right after, the complete exfoliation of clay in the host polymer.

Delivering Functional and Processing Additives

Using the oil-in-water microemulsion of a polymeric surfactant to treat aqueous clay solution can provide additional processing benefits beside facile clay exfoliation in a host polymer. The large amount of hydrophobic silicone in the intercalation treatment of clay allows the inclusion and delivery of other hydrophobic functional ingredient into the hydrophobic host polymer domains among exfoliated clay platelet. Functional additives common to the plastic processing such as lubricants, plasticizers, dyes, chemical or physical blowing agents, crosslinkers, etc., often required their premixing with a carrier resin in the form of a masterbatch to facilitate the final uniform dispersion within the host polymer.

In one aspect, the present invention is directed a process of dispersing a functional ingredient into a polymer-clay nanocomposite, comprising the steps of: (i) penetrating the polymer silicone surfactant of the present invention into the spacing of the clay layers in an aqueous medium by mixing the clay with a microemulsion of the silicone surfactant to form a clay-microemulsion mixture, and then adjusting the pH of the mixture within the range of pH 1-5; (ii) heating the mixture of (i) to accelerate the penetration of the surfactant into the spacing of clay layers in an aqueous medium to form a silicon surfactant-clay slurry; (iii) mixing one or more functional ingredients into the slurry; (iv) removing excess water from the slurry; (v) drying the slurry to form a silicone surfactant intercalated clay; and (vi) mixing the silicone surfactant intercalated clay with one or more polymers to form a polymer-clay nanocomposite; wherein the nanocomposite has clay exfoliation within the one or more polymers and has a dispersed functional ingredient.

In the above process, step (iii) is carried out either before step (iv) or after step (iv).

The silicone surfactant treated clay of this invention can be uniformly dispersed and fully exfoliated into the host polymers and thus can be utilized to carry functional additives as a masterbatch. For example, a functional additive can be mixed with a microemulsion mixture of clay and polymeric silicone surfactants prior to its drying. The microemulsion mixture contains both hydrophilic and hydrophobic components uniformly dispersed in the respective submicron domains and thus, can most effectively carry and disperse both hydrophobic and hydrophilic functional additives into the polymers. The clay mixture drying temperature is lower than the thermal mixing of a masterbatch and can be further lowered with a solvent exchange, or vacuuming, to protect thermally sensitive additives such as a foaming agent.

The present invention using silicone copolymer intercalation to carry additional chemically attached functional groups, or physically blended (hydrophobic) processing aids into the host polymer can further enhance the performance of a polymer-clay nanocomposite beyond which achievable from clay exfoliation alone. Incorporation of such crosslinking functional aids to the silicone surfactant treated clay can achieve the easiest and finest dispersion of the crosslinkers within a polymer-clay nanocomposite and reinforce the mechanical strength more than exfoliated clay alone.

Examples of functional additives that can be more effectively carried and dispersed (than common masterbatches)

by the clay-silicone surfactant batch of the present invention include, but not limited to, pigments, dyestuff, polymer blend compatibilizer, rheology modifier, crosslinker, chain extender, physical and chemical foaming agents, nucleating agent, processing oil, fire and smoke retardant, free radical scavengers, moisture barrier, oil repellent, ink dispenser, antistatic agent, antiskid agent, antifogging agent, antimicrobial agent, antioxidant, impact absorber, heat absorber/reflector, UV blocker, electromagnetic radiation blocker.

Summary of Applications

The facile clay exfoliation technology disclosed here provides an easy intercalation followed by simple polymer processing (for example, mixing, compounding, or melt extrusion), and represents a significant technology advancement and commercial breakthrough. Commodity thermoplastics such as polyolefin (TPO) can be cost-effectively compounded into high-performance and light-weight nanocomposites with less than 5% exfoliated clay, achieving substantial cost and weight savings compared with commonly ten times higher amount of talc filler. For PET-Clay nanocomposite, the gas barrier property also becomes exceptional with full clay exfoliation. Numerous applications include automotive parts, appliance, electronic casing, food packaging, and fire-retardation, are already in existence and in demand. The facile exfoliation of clay in a commodity polymer can offer substantial upgrade in the performance/cost ratio of many similar products.

The aviation industry has been actively looking for an advanced fire-resisting (insulation and interior finishing) foams since the Swissair flight 111 crashed in September 1998. This disclosed invention is part of the effort of further elevating the insulation value and the fire resistance performance of future insulating products. By incorporating additional foaming agents and fire-retarding ingredients such as free radical scavengers into the clay galleries prior to polymer compounding could lead to superior performances in thermal insulating and fire resistance. Such polymer-clay nanocomposites with additional functional ingredients to highly resist thermal degradation, fire and smoke spread can become a platform technology with broad commercial applications in the market of halogen-free, fire-resistant polymer products.

The technology disclosed here has many other important impacts beyond the making of polymer-clay nanocomposite. The natural platelet morphology of an exfoliated clay structure provides one of the best options of creating high contact surface area (~500 $m^2/g$ when fully exfoliated) without a costly synthesis effort. The open channel structure and high contact area surrounding a catalyst carried within a pillared clay substrate are most effective in enhancing catalysis. These same morphological features are also the platform for making a super adsorbent for many separation tasks. By chemically modifying clay surfaces after its full exfoliation, we can make nanopore substrates for water purification, enzyme catalysis, chemical separation etc. Exfoliated clay layers are also best carriers for organic insecticides, antimicrobial and antifungal substances for many agricultural uses. Last, but not least, are many new developments in the emerging biomedical application market which require bioengineered material designed for tissue engineering, bone regeneration, controlled drug delivery, and sustained release of cosmetic as well as health-maintaining ingredients.

EXAMPLES

Example 1

Montmorillonite clay (CLOISITE-116, BYK-Chemie GmbH), 10 g, was dispersed in 100 ml of 2M HCl and stirred for 1 hour to exchange the $Na^+$ ion in clay with $H_3O^+$. The $H_3O^+/Na^+$ is approximately 200/12. The slurry was acid washed and centrifuged to remove the acid and then further washed with 100 ml of deionized water. (The repeated acid washing is designed to remove cations from the clay surface and turning the hydroxide groups on the clay surface into hydroxyls for enhancing hydrogen bonding interactions.) Silicone copolymer surfactant (m.w. 10,000 Da and 5% of diamine component) was emulsified in water with the addition of alkyl alcohol ethoxylate (PEG) based emulsifiers. The composition ratio was 70% water, 12% PEG emulsifier, and 18% of silicone copolymer. The slurry was centrifuged to remove excess water and then added to 34 g of the microemulsion (containing approximately 24 g water, 4 g PEG emulsifier, and 6 g silicone copolymer) with vigorous mechanical stirring.

Example 2

Figure 3:
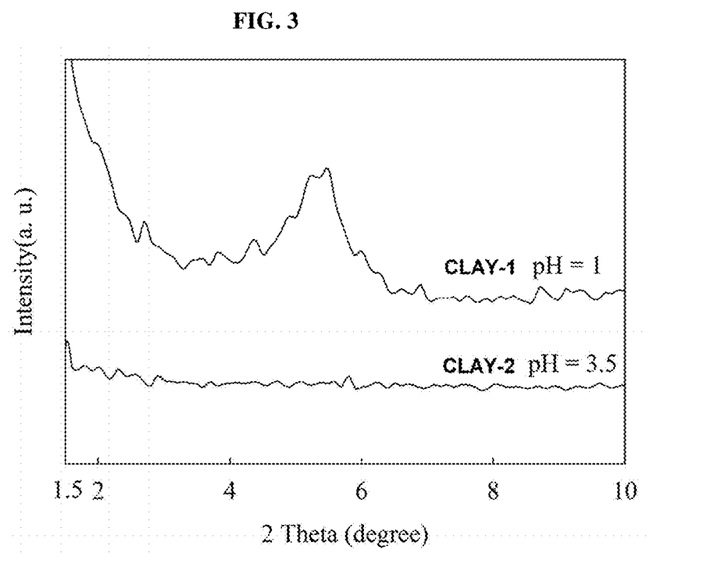
FIG. 3 is a graph showing data results from an x-ray scattering test for dried clay samples.
Figure 4:
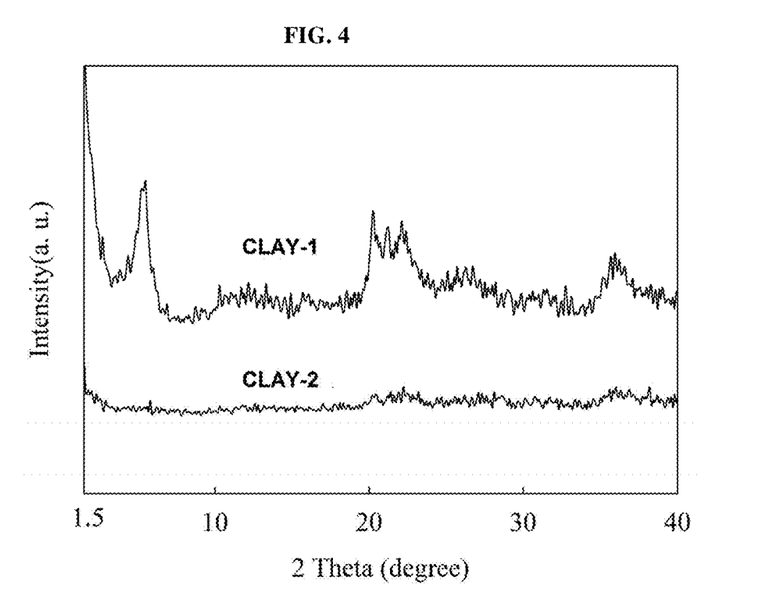
FIG. 4 is another graph showing data results for samples shown in FIG. 3.

Aliquots of the clay slurry from EXAMPLE 1 were treated with either acetic acid or ammonium hydroxide to adjust the pH over a range of 1-5. Each pH adjusted aliquot was heated to 95° C. and stirred for 6 hours following by centrifuging to concentrate the solids followed by drying in an oven. Select samples that were prepared using the aliquots with adjusted pH=1 (CLAY-1) and pH=3.5 (CLAY-2). As shown in FIGS. 3-4, relative levels of clay delamination/exfoliation in the silicone treated clay were then compared by x-ray scattering testing by graphing the scattering intensity versus scattering angle (2 theta). For CLAY-1, the scattering peak as shown in FIG. 3 at 5.5° corresponds to an interlayer distance between the clay platelets of 1.67 nm; which is somewhat more expanded compared to a value of 1.27 nm for unmodified CLOISITE-116. It is concluded that when using pH=1, the clay platelets are poorly exfoliated. In contrast, for the pH=3.5 (CLAY-2) sample, there is no scattering peak between 1.5-10° and also much lower intensity peaks in the 2 Theta>10° region as shown in FIG. 4. It is concluded that for the pH=3.5 (CLAY-2) sample, the clay plates are exfoliated to much greater extent.

Example 3

Samples of CLAY-1 and CLAY-2 from EXAMPLE 2, were compounded with a representative polyethylene terephthalate polymer (PET) with additional compatibilizers. The PET (9 EF 04) was supplied by Son Cho Technology Corporation, Taiwan. Two compatibilizers, mPE-MA (maleic anhydride functionalized metallocene polyethylene, 7131) and SEBS-MA (maleic anhydride functionalized styrene-ethylene-butylene-styrene, N493) were provided by Taiwan Synthetic Rubber Company, Taiwan. The silicone modified clays were dried in an air-circulated oven at 90° C. for 2 hours. PET was dried in a vacuum oven at 110° C. for 4 hours. Both compatibilizers were dried in the vacuum oven at 50° C. for 12 hours. SEBS-MA (or mPE-MA) were mixed with clay first in a batch mixer (Brabender 815605 Plastograh, Brabender GmbH & Co. KG, Germany) at a rotor speed of 50 rpm for 10 min at 180° C. Subsequently PET pellets were mixed with the prepared SEBS-MA (or mPE-MA)/clay mixtures in the same mixer at a rotor speed of 50 rpm for 10 min at 250° C. The final composition was in the weight ratio of 100:20:3 (PET:compatibilizer:clay). After their preparation, the samples were hot-pressed in the compression molding machine at 250 C for 3 minutes, followed by air-cooling to room temperature.

Figure 5:
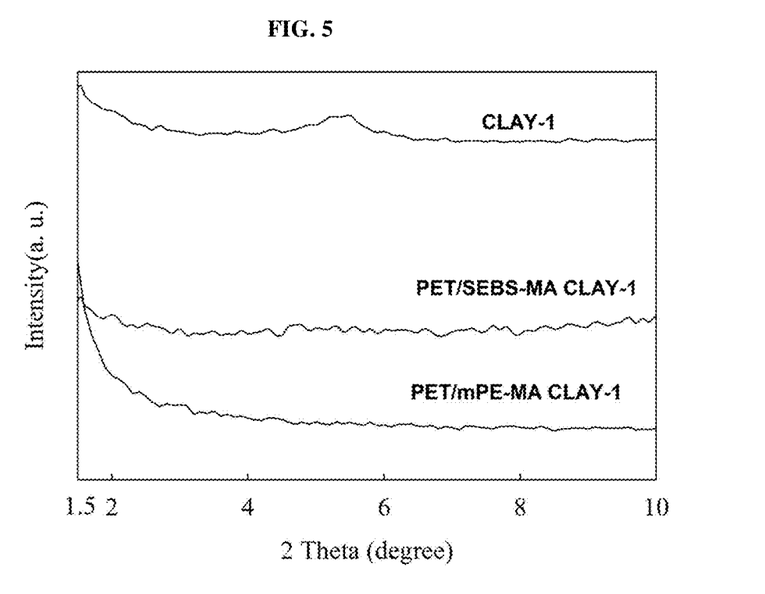
FIG. 5 is a graph showing data results from an x-ray scattering test for a dried clay sample and nanocomposites.
Figure 6:
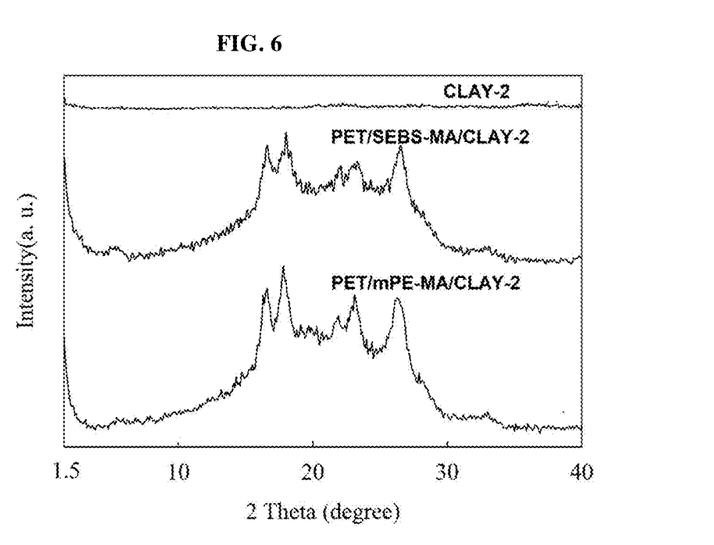
FIG. 6 is another graph showing data results for samples shown FIG. 5.
Figure 7:
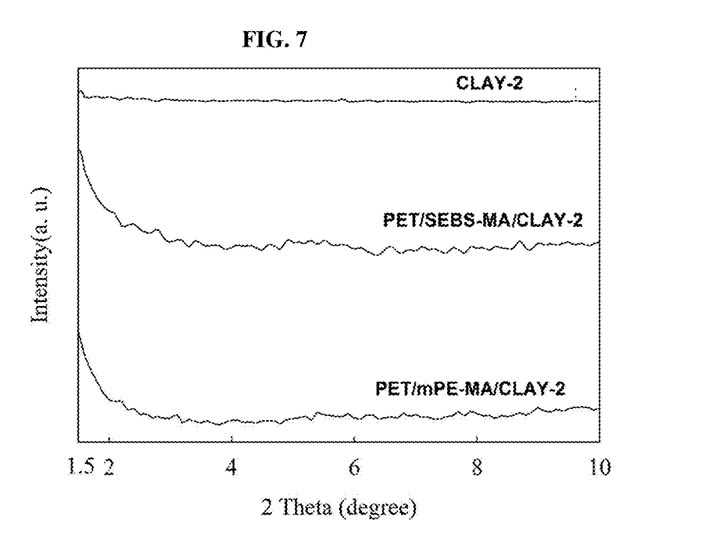
FIG. 7 is a graph showing data results from an x-ray scattering test for dried clay sample and nanocomposites.
Figure 8:
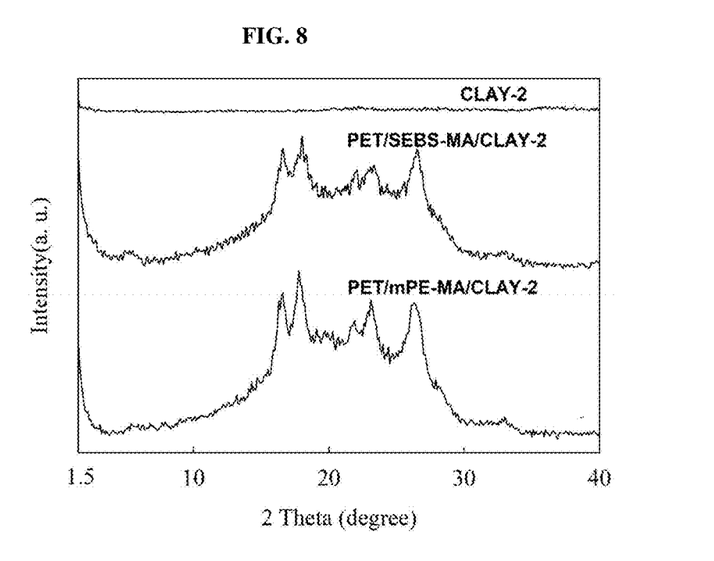
FIG. 8 is another graph showing data results for samples shown FIG. 7.

FIGS. 5-8 show the x-ray scattering test data of CLAY-1 and CLAY-2 and their nanocomposites (PET/SEBS-g-MA/clay and PET/mPE-g-MA/clay). As shown in FIGS. 5 and 7, the x-ray scattering peaks in the <10° region were not visible for both SEBS-g-MA and mPE-g-MA compatibilized PET nanocomposites filled with CLAY-1 or CLAY-2. As shown in FIG. 6 and FIG. 8, x-ray scattering diffraction peaks at 16.6°, 18.0° 22.1°, 26.5° were detected for the nanocomposites and are associated with crystallized PET. It is concluded that these nanocomposites have an exfoliated structure of dispersed clay within the PET matrix when the silicone modified clays of EXAMPLE 2 are used in the presence of the compatibilizer copolymers under sufficient shear stress during compounding process.

Example 4

Preparation of nanogel to carry a foaming agent—Absolute ethanol (1800 g), water (324 g) and dilute hydrochloric acid (2M, 36.5 g) were mixed in a glass vessel and the solution was vigorously stirred under mechanical agitation while 720 g of TEOS (tetraethylorthosilicate) was added over a ten-minute period. The temperature of the mixture was controlled by an external cooling bath such that it reaches but does not exceed 30° C. The resulting clear silica sol solution was maintained under agitation at ambient temperature for a further 120 minutes and then stored at 20° C. for 24 hours. Under mechanical stirring the solution pH was then adjusted from 2.2 to 7.0 by dropwise addition of 1M $NH_4OH$. After 10 minutes the mixture gelled and was then aged for additional 24 hours. The excess ethanol from synthesis of the gel was removed and then the gel was broken up into small (3-5 mm) pieces and partially dried by spreading the gel particles on large trays and allowing the solvent to evaporate in a fume hood. The partially dried gel particles were pressed through a sieve (US mesh size 20, 850 micron opening). This further broke up the particles and resulted in 1 kg of a free-flowing powder with approximately 20% solids content.

In-situ foaming of wine bottle stopper by nanogel carried blowing agent—Samples of the partially dried alcogel is mixed with SEBS elastomers supplied by Taiwan Synthetic Rubber Company in an injection molding machine to produce foamed, wine bottle stopper. The injection molding process was adjusted through various temperature profiles ranging from 150° C. to 210° C. To avoid the surface shrinkage of foamed sample, the injection speed and additional nozzle heating zone were fine-tuned. For instance, the temperature profile along the extrusion-injection path was set as 185-195-200-210° C. The injection speed and additional nozzle heating zone were set at 50% and 40% of full capacity power, respectively. The alcohol in the gel foamed the SEBS elastomer to the density of 0.55 g/cc (nearly two times of volume expansion) for only 0.25 parts-per-hundred of alcogel.

What is claimed is:

1. A process for preparing a silicone surfactant intercalated clay, comprising the steps of:
   (a) obtaining a silicone surfactant, comprising PDMS (polydimethylsiloxane) hydrophobic backbone having hydrophilic, side-chain functional groups, with a general formula of, wherein X is a hydrophilic component in a hydrophilic block and interacts with acidic —OH groups at the clay surfaces, m is an integer from 1 to 20, p is an integer from 10 to 100, R is $C_{1-6}$ alkyl, m times p represents the molecular weight of the silicone surfactants in the range of 10,000 to 100,000 Dalton, wherein the position of the hydrophilic block containing X is distributed among the m dimethyl siloxane groups to provide a hydrophilic-hydrophobic block,
   (b) penetrating the silicone surfactant of (a) into the spacing of the clay layers in an aqueous medium by mixing the clay with a microemulsion of the silicone surfactant to form a clay-microemulsion mixture, and then adjusting the pH of the mixture within the range of pH 1-5,
   (c) heating the mixture of (b) to accelerate the penetration of the surfactant into the spacing of clay layers in an aqueous medium to form a silicone surfactant-clay slurry, and
   (d) removing excess water from the slurry and drying the slurry to form a silicone surfactant intercalated clay.

2. A process for preparing a polymer-clay nanocomposite, comprising:
   mixing the silicone surfactant intercalated clay prepared according to claim 1 with one or more polymers to form a polymer-clay nanocomposite, wherein the nanocomposite has clay exfoliation within the one or more polymers.

3. The process according to claim 2, wherein the mixing is by Brabender batch mixing, injection molding, melt extrusion, or film calendaring.

4. The process according to claim 1, wherein X is selected from the group consisting of: OH, —COOH, —$NR_1H$, —$NR_1R_2H^+X^-$, —CO—NHR, —(O—$CH_2$—$CH_2$—)$_nR_1$, —(O—$CH_2$—$CHCH_3$—)$_y$,—(O—$CH_2$—$CH_2$—)$_zH$, and —C=C—COOH, wherein $R_1$ and $R_2$ are independently H or $C_{1-6}$ alkyl, and y and z are independently an integer from 1 to 30.

5. The process according to claim 1, wherein the heating of the clay-microemulsion mixture is carried out at 50-95° C. for 1-5 hours.

6. The process according to claim 1, wherein the drying in step (d) is carried out by mixing the slurry with one or more solvents of an organic acid, alcohol, ketone, or aldehyde, followed by evaporating the residual moisture.

7. A process of dispersing a functional ingredient into a polymer-clay nanocomposite, comprising the steps of:
   (i) penetrating the silicone surfactant as defined in claim 1 into the spacing of the clay layers in an aqueous medium by mixing the clay with a microemulsion of the silicone surfactant to form a clay-microemulsion mixture, and then adjusting the pH of the mixture within the range of pH 1-5,
   (ii) heating the mixture of (i) to accelerate the penetration of the surfactant into the spacing of clay layers in an aqueous medium to form a silicon surfactant-clay slurry, (iii) mixing one or more functional ingredients into the slurry,
(iv) removing excess water from the slurry,
(v) drying the slurry to form a silicone surfactant intercalated clay, and
(vi) mixing the silicone surfactant intercalated clay with one or more polymers to form a polymer-clay nanocomposite, wherein the nanocomposite has clay exfoliation within the one or more polymers and has a dispersed functional ingredient.

8. The process according to claim 7, wherein one or more functional ingredients are selected from the group consisting of: pigments, dyestuff, polymer blend compatibilizer, rheology modifier, crosslinker, chain extender, physical and chemical foaming agents, nucleating agent, processing oil, fire and smoke retardant, free radical scavengers, moisture barrier, oil repellent, ink dispenser, antistatic agent, antiskid agent, antifogging agent, antimicrobial agent, antioxidant, impact absorber, heat absorber/reflector, UV blocker, and electromagnetic radiation blocker.

9. A process of dispersing a functional ingredient into a polymer-clay nanocomposite, comprising the steps of:

(i) penetrating the silicone surfactant as defined in claim 1 into the spacing of the clay layers in an aqueous medium by mixing the clay with a microemulsion of the silicone surfactant to form a clay-microemulsion mixture, and then adjusting the pH of the mixture within the range of pH 1-5,
(ii) heating the mixture of (i) to accelerate the penetration of the surfactant into the spacing of clay layers in an aqueous medium to form a silicon surfactant-clay slurry,
(iii) removing excess water from the slurry,
(iv) mixing one or more functional ingredients into the slurry,
(v) drying the slurry to form a silicone surfactant intercalated clay, and
(vi) mixing the silicone surfactant intercalated clay with one or more polymers to form a polymer-clay nanocomposite, wherein the nanocomposite has clay exfoliation within the one or more polymers and has a dispersed functional ingredient.

* * * * *